(12) United States Patent
Shalem et al.

(10) Patent No.: US 9,170,968 B2
(45) Date of Patent: Oct. 27, 2015

(54) DEVICE, SYSTEM AND METHOD OF MULTI-CHANNEL PROCESSING

(71) Applicant: Intel Corporation, Santa Clara, CA (US)

(72) Inventors: Elihay Shalem, Rishon Letziyon (IL); Noam Tal, Givataim (IL); Naor Goldman, Moshav Ein Vered (IL); Efrat Levy, Tel Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 441 days.

(21) Appl. No.: 13/628,515

(22) Filed: Sep. 27, 2012

(65) Prior Publication Data

US 2014/0089555 A1    Mar. 27, 2014

(51) Int. Cl.
*G06F 9/40* (2006.01)
*G06F 13/36* (2006.01)
*H04W 76/02* (2009.01)

(52) U.S. Cl.
CPC ............. *G06F 13/36* (2013.01); *H04W 76/025* (2013.01)

(58) Field of Classification Search
USPC .......................................... 712/228; 718/108
See application file for complete search history.

(56) References Cited

U.S. PATENT DOCUMENTS

| H586 H * | 2/1989 | Kun ............................. 370/384 |
| 4,837,688 A * | 6/1989 | Cronauer et al. ............. 718/103 |
| 5,187,799 A * | 2/1993 | McAuley et al. ............... 712/36 |
| 5,825,770 A * | 10/1998 | Coady et al. .................. 370/378 |
| 5,907,702 A * | 5/1999 | Flynn et al. ................... 718/108 |
| 6,055,270 A * | 4/2000 | Ozkan et al. ............. 375/240.03 |
| 6,122,380 A * | 9/2000 | Pedlow, Jr. ......................... 381/2 |
| 6,145,049 A | 11/2000 | Wong |
| 6,401,155 B1 * | 6/2002 | Saville et al. ................. 710/266 |
| 7,191,319 B1 * | 3/2007 | Dwyer et al. ................. 712/228 |
| 7,343,480 B2 | 3/2008 | Luick |
| 7,873,816 B2 * | 1/2011 | Hickey et al. ................. 712/228 |
| 2001/0047468 A1 | 11/2001 | Parady |
| 2002/0083253 A1 | 6/2002 | Leijten et al. |
| 2004/0184457 A1 * | 9/2004 | Gregorio et al. ............. 370/392 |
| 2005/0270870 A1 * | 12/2005 | Shin et al. ...................... 365/202 |
| 2006/0136619 A1 * | 6/2006 | Edirisooriya et al. .......... 710/52 |
| 2006/0294344 A1 | 12/2006 | Hsu et al. |
| 2007/0022428 A1 * | 1/2007 | Yamasaki ...................... 718/108 |
| 2007/0266387 A1 * | 11/2007 | Henmi ......................... 718/102 |
| 2008/0127131 A1 * | 5/2008 | Gao et al. ...................... 717/140 |
| 2008/0282034 A1 * | 11/2008 | Jiao et al. ...................... 711/125 |
| 2009/0077564 A1 * | 3/2009 | Loeser .......................... 718/108 |
| 2009/0287857 A1 * | 11/2009 | Vu ................................. 710/22 |
| 2010/0242025 A1 * | 9/2010 | Yamazaki et al. ............ 717/127 |
| 2013/0304481 A1 * | 11/2013 | Briand et al. ................. 704/500 |

OTHER PUBLICATIONS

International Search Report and Written Opinion for PCT/US2013/048093, mailed on Sep. 30, 2013, 13 pages.
International Preliminary Report on Patentability and Written Opinion for PCT/US2013/048093, mailed on Apr. 9, 2015, 9 pages.

* cited by examiner

*Primary Examiner* — Paul R. Myers
(74) *Attorney, Agent, or Firm* — Shichrur & Co.

(57) ABSTRACT

Some demonstrative embodiments include devices, systems and methods of multi-channel processing. For example, a multi-channel data processor may process data of a plurality of channels, the multi-channel data processor is to switch from processing a first channel to processing a second channel of the plurality of channels by performing a context switch during a single clock cycle, the context switch including storing first state context corresponding to a processing state of the first channel and loading previously stored second state context corresponding to a processing state of the second channel.

17 Claims, 7 Drawing Sheets

DEVICE, SYSTEM AND METHOD OF MULTI-CHANNEL PROCESSING

BACKGROUND

Some communication networks, may communicate data over a plurality of communication channels.

For example, a cable network may include a cable modulator-demodulator (modem) capable of transferring downstream data, which is modulated over a plurality of downstream channels, from a Cable-Modem-Termination-System (CMTS) to one or more devices (subscriber devices), and transferring upstream data, which is modulated over a plurality of upstream channels, from the devices to the CMTS.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
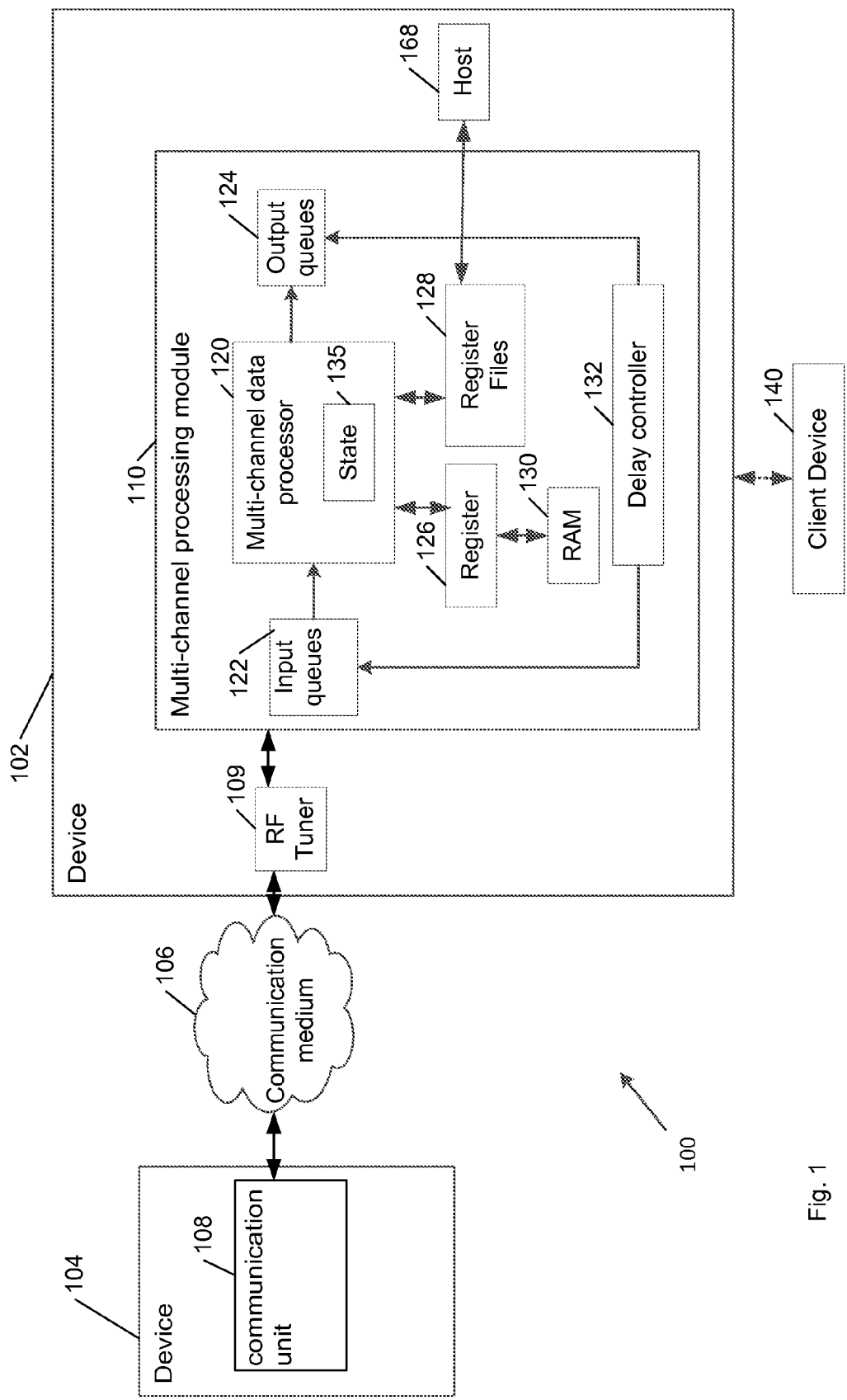
FIG. 1 is a schematic block diagram illustration of a system, in accordance with some demonstrative embodiments.

In the following detailed description, numerous specific details are set forth in order to provide a thorough understanding of some demonstrative embodiments. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The terms "a" or "an", as used herein, are defined as one, or more than one. The term plurality, as used herein, is defined as two, or more than two. The term another, as used herein, is defined as, at least a second or more. The terms including and/or having, as used herein, are defined as, but not limited to, comprising.

The term coupled as used herein, is defined as operably connected in any desired form for example, mechanically, electronically, digitally, directly, by software, by hardware and the like.

Some embodiments may be used in conjunction with various devices and systems, for example, a communication system, a communication device, a wired communication device, a cable communication device, a wired communication system, a cable communication system, a modem, a gateway, a cable network, a cable modem, a cable gateway, a Personal Computer (PC), a server, a networking device, a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like. It will be understood by those skilled in the art that this is a very brief list of the many, many devices in or with which the disclosed embodiments may be used.

Some embodiments may be used in conjunction with one way and/or two-way communication systems, cable communication systems, radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

Although not limited in this respect, the term "integrated circuit" (IC), as used herein refers to any suitable microcircuit, microchip, hybrid integrated circuit, digital integrated circuit and/or any other suitable electronic circuit, which includes, for example, a plurality of electronic devices manufactured in the surface of a thin substrate.

Although not limited in this respect, the term "system on chip" (SoC), as used herein refers to a single IC including a plurality of modules and/or components of a system. The SoC includes digital, analog, mixed-signal, radio-frequency (RF) and/or any other suitable functions.

In one embodiment, the SoC may include one or more controllers, processors, microcontrollers, microprocessors, Digital-Signal-Processing (DSP) cores; one or more memories; one or more timing sources, e.g., oscillators and/or phase locked loops; one or more peripherals, e.g., counter-timers or power-on reset generators; one or more external interfaces, e.g., a Universal Serial Bus (USB), an Ethernet interface, Universal Asynchronous Receiver-Transmitter (UART), a Serial Peripheral Interface (SPI), and the like; one or more digital interfaces; one or more analog interfaces; and/or any other suitable modules.

For example, a communication device, e.g., a cable modulator-demodulator (modem) or a cable gateway, may include a SoC capable of processing downstream and/or upstream digital samples corresponding to downstream and/or upstream RF channels of a communication system, e.g., a cable communication system.

The term "communicating" as used herein with respect to a communication signal includes transmitting the communication signal and/or receiving the wireless communication signal. For example, a wired or wireless communication unit, which is capable of communicating a wired or wireless communication signal, may include a transmitter to transmit the communication signal to at least one other wired or wireless communication unit, and/or a receiver to receive the communication signal from at least one other communication unit.

Reference is no made to FIG. 1, which schematically illustrates a system 100, in accordance with some demonstrative embodiments.

In some demonstrative embodiments, system 100 may include one or more devices, e.g., devices 102 and 104, capable of communicating over at least one communication medium 106.

In some demonstrative embodiments, system 100 may include a cable communication system.

In one example, device 102 may include a cable communication device, e.g., a cable modem, device 104 may include a cable communication device, e.g., a Cable-Modem-Termination-System (CMTS) 104, and/or communication medium 106 may include a cable network.

According to this example, device 102 may transfer downstream (DS) data signals from device 104 to one or more devices (also referred to as "subscriber devices", or "client devices") 140, and/or device 102 may transfer upstream (US) data signals from subscriber devices 140 to the device 104.

In some demonstrative embodiments, device 102 may include, or may be part of, a cable modem, a cable gateway, and the like.

In some demonstrative embodiments, system 100 may include a Cable Television (CATV) communication system capable of communicating data between device 104 and client devices 118 via RF signals transmitted through medium 106. Medium 106 may include, for example, a network of coaxial cables and, optionally, optical fibers, e.g., if medium 106 includes a Hybrid Fiber Coaxial (HFC) infrastructure. The data communicated between device 104 and client devices 118 may include, for example, television data, video data, audio data, Internet data, telephony data, and the like.

In some demonstrative embodiments, one or more elements of system 100 may be configured to communicate in accordance with the Data Over Cable Service Interface Specification (DOCSIS), e.g., DOCSIS 3.0, and/or any other cable communication standard and/or specification.

In some demonstrative embodiments, client devices 118 may include, for example, at least one of a television device capable of receiving television data from device 104 via device 102, a telephone device cable of exchanging telephone signals with device 104 via device 102, a video device capable of receiving video data from device 104 via device 102, an audio device capable of receiving audio data from device 104 via device 102, an internet-protocol (IP) device capable of exchanging IP signals with device 104 via device 102, a storage device capable of storing and/or processing data received from device 104 via device 102, a Wireless Local Area Network (WLAN) device capable of communicating data to/from device 104 via a WLAN, and the like.

Although some demonstrative embodiments are described herein with respect to one or more cable communication devices and/or cable communication systems, other embodiments may include any other suitable wired or wireless communication devices and/or systems. For example, in some demonstrative embodiments devices 102 and 104 may include wireless communication devices, and communication medium 106 may include a wireless communication medium.

In some demonstrative embodiments, device 102 and/or device 104 may include at least one RF tuner 109 to communicate over a plurality of channels, e.g., via medium 106. For example, RF tuner 109 of device 102 may be implemented as part of a suitable Analog Front End (EFE) of device 102, and/or any other module or element of device 102.

In some demonstrative embodiments, RF tuner 109 may receive, e.g., via communication medium 106, downstream signals including downstream data communicated from device 104 to device 102; and/or RF tuner 109 may transmit, e.g., via communication medium 106, upstream signals including upstream data communicated from device 102 to device 104.

In some demonstrative embodiments, the downstream and/or upstream signals may include analog signals configured to be communicated over a cable network, e.g., if system 100 includes a cable communication system and communication medium 106 includes a cable network.

For example, RF tuner 109 may be configured to receive from the cable network the downstream signals in the form of an analog input including a plurality of downstream data channels. In one non-limiting example, RF tuner 109 may be configured to receive the downstream signals in the form of an analog RF signal modulated over an RF downstream frequency band, e.g., an RF frequency band of 54-1002 Megahertz (MHz), or any other RF frequency band. In one non-limiting example, the downstream signals may include at least sixteen downstream channels, e.g., at least 32 downstream channels. In other embodiments, the downstream signals may be modulated over any other RF band and/or may include any other number of downstream channels.

For example, RF tuner 109 may be configured to transfer the upstream signals over the cable network in the form of an analog output including an upstream data channel. In one non-limiting example, RF tuner 109 may be configured to provide the upstream signals in the form of an analog RF signal modulated over an RF upstream frequency band, e.g., an RF frequency band of 5-85 MHz, or any other RF frequency band. In other embodiments, the upstream signals may be modulated over any other RF band and/or may include two or more upstream channels.

In some demonstrative embodiments, device 102 and/or device 104 may include at least one multi-channel processing module 110 to process data of the plurality of communication channels, e.g., as described in detail below.

In some demonstrative embodiments, multi-channel processing module 110 may receive digital data samples corresponding to the data communicated over the plurality of communication channels. For example, analog data signals received via communication medium 106 may be converted into digital data samples, for example, using one or more Analog to Digital Converters (ADCs), e.g., as described below with reference to FIG. 2.

In some demonstrative embodiments, multi-channel processing module 110 may include or may be implemented as part of a multi-channel receiver (MCR) to process received data, e.g., received by RF tuner 109, from the plurality of communication channels, e.g., as described in detail below.

In other demonstrative embodiments, multi-channel processing module 110 may include or may be implemented as part of a multi-channel transmitter to process data to be transmitted, e.g., by RF tuner 109, over the plurality of communication channels.

In some demonstrative embodiments, device 102 may include two separate multi-channel processing modules 110, e.g., a multi-channel receiver and a multi-channel transmitter, to process the received and transmitted data, respectively. In other embodiments, device 102 may include a multi-channel processing module 110 to process both the received and transmitted data.

In some demonstrative embodiments, multi-channel processing module 110 may include, or may be implemented as part of, a SoC. For example, multi-channel processing module 110 may include a SoC capable of processing downstream and/or upstream digital samples communicated over downstream and/or upstream RF channels of system 100, e.g., in accordance with the DOCSIS and/or any other standard.

In some demonstrative embodiments, multi-channel processing module 110 may include a multi-channel data processor 120 configured to process the data of the plurality of channels, e.g., as described in detail below.

For example, if multi-channel processing module 110 performs the functionality of a MCR, multi-channel data processor 120 may perform the functionality of a plurality of receiver processors, which may process data of the received data of the plurality of the channels, respectively. In one example, multi-channel data processor 120 may "wrap" a single instance of a receiver processor and utilize the wrapped instance for processing the received data of the plurality of channels.

In some demonstrative embodiments, multi-channel data processor 120 may include, or may be implemented as part of, a hardware engine, a processing engine, and the like.

Figures 2, 3:
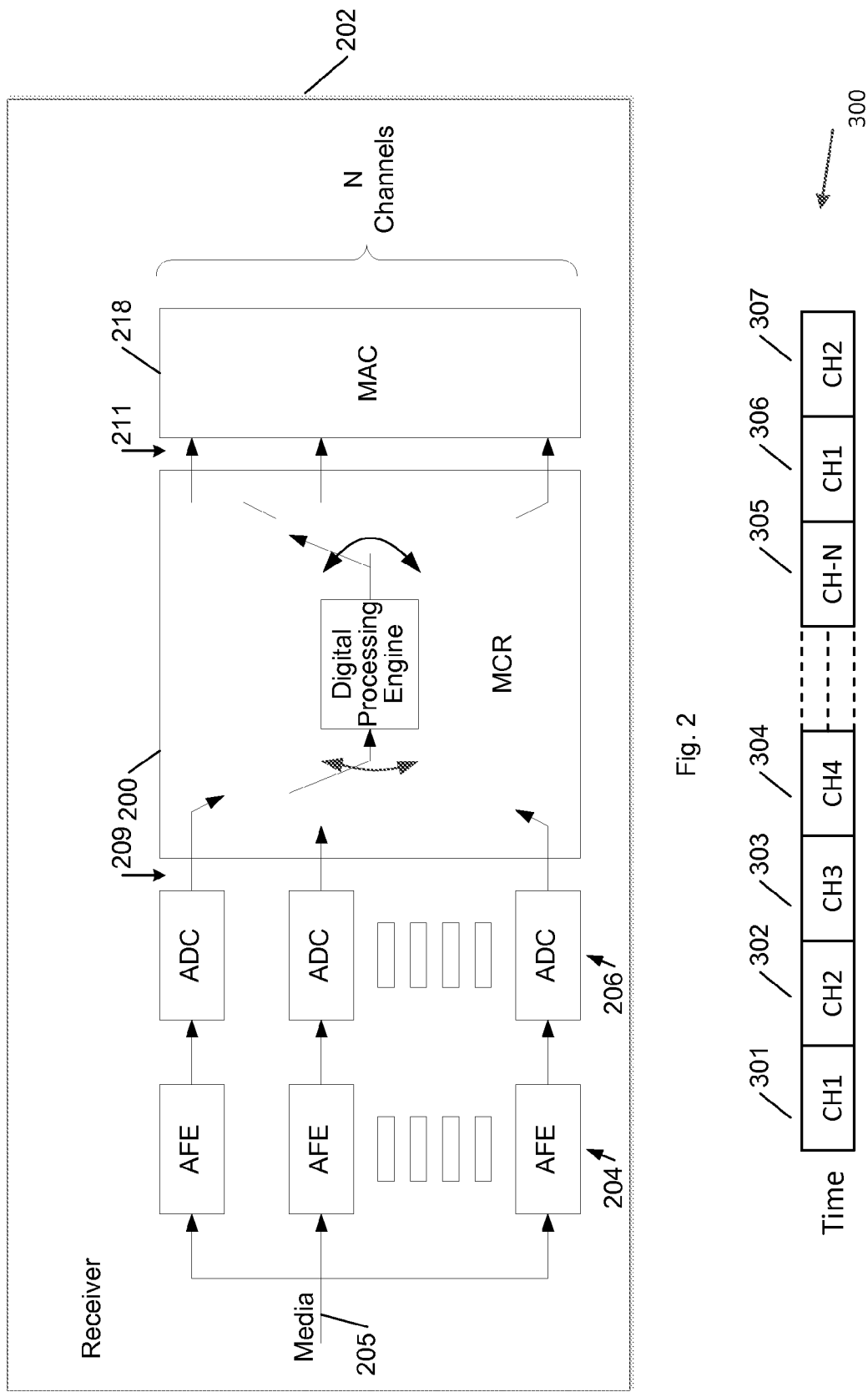
FIG. 2 is a schematic illustration of a multi-channel receiver, in accordance with some demonstrative embodiments.
FIG. 3 is a schematic illustration of a multi-channel timing scheme, in accordance with some demonstrative embodiments.

Reference is made to FIG. 2, which schematically illustrates a multi-channel receiver 200, in accordance with some demonstrative embodiments. In some demonstrative embodiments, multi-channel receiver 200 may perform the functionality of multi-channel processing module 110 (FIG. 1).

In some demonstrative embodiments, multi-channel receiver 200 may be included as part of a receiver unit 202. For example, receiver unit 202 may be included as part of a cable modem to receive downstream signals over a cable network, e.g., as described above. In other demonstrative embodiments, receiver unit 202 may be included as part of any other wired or wireless communication device.

In some demonstrative embodiments, receiver unit 202 may include a plurality of AFEs 204 to receive analog RF signals 205 of a respective plurality of communication channels via a communication medium, e.g., via communication medium 106 (FIG. 1).

In some demonstrative embodiments, receiver unit 202 may include a plurality of ADCs 206 to convert the analog signals of the plurality of communication channels into a plurality of streams 209 of digital samples, e.g., each stream 209 corresponding to a respective communication channel of the plurality of communication channels.

In some demonstrative embodiments, multi-channel receiver 200 may include a multi-channel data processor 210 to process the digital samples of streams 209 and to provide a plurality of streams 211 including processed digital data of the plurality of communication channels, e.g., each stream 211 corresponding to a respective communication channel of the plurality of communication channels.

In some demonstrative embodiments, multi-channel receiver 200 may be configured to perform the functionality of a plurality of data processors, e.g., a plurality of single-channel data processors, each configured to process a single channel of the plurality of communication channels.

In some demonstrative embodiments, multi-channel receiver 200 may be configured to receive streams 209 at a suitable timing, rate and/or order, e.g., sequentially, simultaneously, asynchronously, isochronously, and the like.

In some demonstrative embodiments, receiver unit 202 may include one or more elements, e.g., a Media-Access-Control (MAC) module 218, to process streams 211.

Referring back to FIG. 1, in some demonstrative embodiments, multi-channel data processor 120 may operate at a relatively high frequency, e.g., an operating frequency greater than an actual processing rate, which may be required for processing the data of the plurality of channels, e.g., greater than a data rate of data streams 209 (FIG. 2).

In some demonstrative embodiments, multi-channel processing module 110 may include a plurality of input queues 122 to queue the data samples of the plurality of communication channels, e.g., a received from streams 209 (FIG. 2), for example, prior to processing by multi-channel data processor 120.

In some demonstrative embodiments, multi-channel processing module 110 may include a plurality of output queues 124 to queue processed data samples of the plurality of communication channels, e.g., after processing by multi-channel data processor 120.

In some demonstrative embodiments, queues 122 and/or 124 may include First In First Out (FIFO) queues and/or any other queues.

In some demonstrative embodiments, multi-channel data processor 120 may process the data samples of the plurality of communication channels according to a predefined timing scheme, e.g., as described below.

In some demonstrative embodiments, the timing scheme may include a Time-Division-Multiplexing (TDM) scheme. For example, the TDM scheme may divide a time line into a sequence of timeslots. The plurality of channels may be assigned to the timeslots, e.g., in a cyclic order or in any other order. During each time slot, multi-channel data processor 120 may process a channel, which is assigned to the time slot. Once the time slot ends, multi-channel data processor 120 may switch to process a channel assigned to a subsequent time slot.

Reference is made to FIG. 3, which schematically illustrates a multi-channel timing scheme 300, in accordance with some demonstrative embodiments. In some demonstrative embodiments, timing scheme 300 may be utilized by multi-channel data processor 120 (FIG. 1).

In some demonstrative embodiments, timing scheme 300 may schedule a plurality of communication channels, including N>1 channels.

As shown in FIG. 3, in some demonstrative embodiments the communication channels may be assigned to a sequence of time slots according to an order of the communication channels. For example, a first channel, denoted CH1, may be assigned to a time slot 301, a second channel, denoted CH2, may be assigned to a time slot 302, immediately successive to time slot 301, a third channel, denoted CH3, may be assigned to a time slot 303, immediately successive to time slot 302, and so on, e.g., until the N-th channel, denoted CH–N, is assigned to a time slot 305.

As shown in FIG. 3, the communication channels may be assigned to the time slots in a cyclical manner. For example, the first channel may be assigned to a time slot 306, immediately successive to time slot 305, the second channel may be assigned to a time slot 307, immediately successive to time slot 306, and so on.

Referring back to FIG. 1, in some demonstrative embodiments multi-channel data processor 120 may process data of a channel ("the processed channel") utilizing state context 135 corresponding to the processed channel.

The state context may include any suitable information corresponding to a state ("processing state") of the processed channel, e.g., a state of multi-channel data processor 120, data processed by multi-channel data processor 120, e.g., channel data of the processed channel, processed data corresponding to the processed channel, and the like. For example, the state context corresponding to a particular channel may include information, which may indicate and/or define a state of multi-channel data processor 120 at a particular point of processing the particular channel, e.g., immediately prior to a context switch between the particular channel and another channel. The state context may include, for example, information to enable multi-channel data processor 120 to resume processing the particular channel, e.g., from the particular point. In one example, the state context may include one or more values stored in a memory or storage of multi-channel data processor 120, for example, one or more, e.g., all, Flip-Flop (FF) circuits of multi-channel data processor 120. For example, the state context may include values of one or more states of one ore more state machines utilized by multi-channel data processor 120, one or more delay lines utilized by multi-channel data processor 120, one or more intermediate results, and the like.

In some demonstrative embodiments, multi-channel data processor 120 may switch from processing a first channel to processing a second channel of the plurality of channels by performing a context switch.

In some demonstrative embodiments, the context switch may include storing first state context corresponding to a processing state of the first channel and loading previously stored second state context corresponding to a processing state of the second channel.

Figure 4:
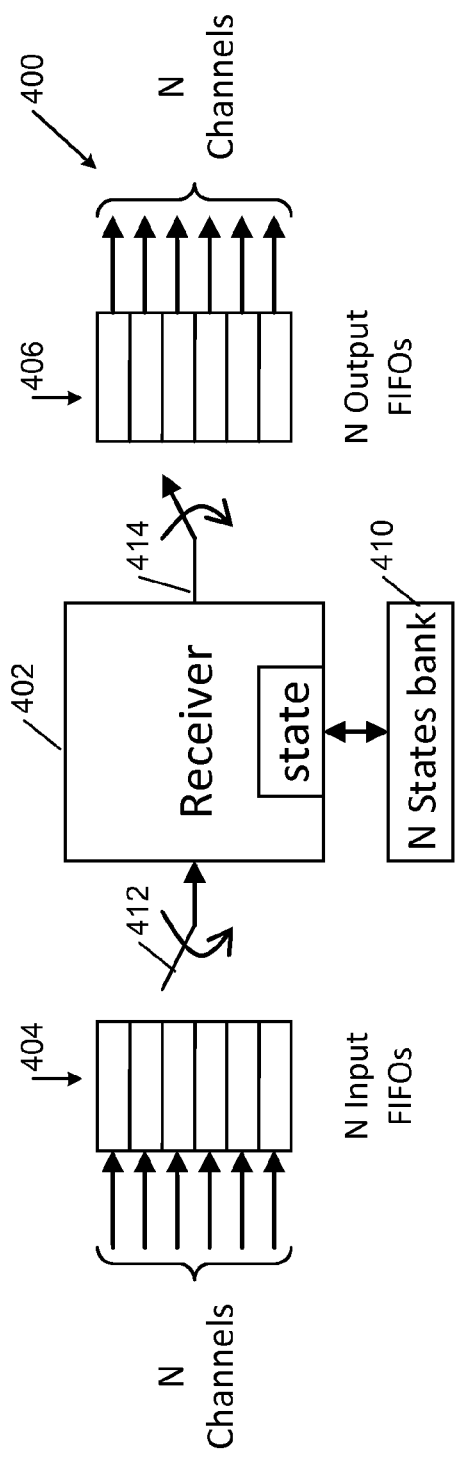
FIG. 4 is a schematic illustration of a multi-channel processing architecture including a multi-channel data processor, in accordance with some demonstrative embodiments.

Reference is now mad to FIG. 4, which schematically illustrates a multi-channel processing architecture 400 including a multi-channel data processor 402, in accordance with some demonstrative embodiments. In some demonstrative embodiments, multi-channel processing architecture 400 may be implemented by multi-channel processing module 110 (FIG. 1), and/or multi-channel data processor may perform the functionality of multi-channel data processor 402 may perform the functionality of multi-channel data processor 120 (FIG. 1).

In some demonstrative embodiments, architecture 400 may include a plurality of FIFO input queues 404, e.g., N FIFO input queues, to queue input data of a plurality of communication channels, e.g., the N communication channels discussed above. In some demonstrative embodiments, queues 404 may perform the functionality of queues 122 (FIG. 1).

In some demonstrative embodiments, architecture 400 may include a plurality of FIFO output queues 406, e.g., N FIFO output queues, to queue output data of the plurality of communication channels after processing by multi-channel data processor 402. In some demonstrative embodiments, queues 406 may perform the functionality of queues 124 (FIG. 1).

In some demonstrative embodiments, multi-channel data processor 402 may sequentially process data of the plurality of channels, for example, by switching between queues 404.

In some demonstrative embodiments, architecture 400 may include a switch 412 to switch an input of multi-channel data processor 402 between input queues 404.

In some demonstrative embodiments, architecture 400 may include a switch 414 to switch an output of multi-channel data processor 402 between output queues 406.

For example, switch 412 may be configured to switch between queues 404, and/or switch 414 may be configured to switch between queues 406 according to timing scheme 300 (FIG. 3).

In some demonstrative embodiments, multi-channel data processor 402 may utilize state context 408 corresponding to a channel being processed by multi-channel data processor 402.

In some demonstrative embodiments, architecture 400 may include a memory ("state bank") 410 to store a plurality of state contexts corresponding to the plurality of channels.

In some demonstrative embodiments, memory 410 may include a Random Access Memory (RAM), e.g., as described below. In other embodiments, memory 410 may include any other suitable type of memory and/or storage.

In some demonstrative embodiments, multi-channel data processor 402 may switch from processing a first channel to processing a second channel of the plurality of channels by performing a context switch to switch between state context 408 corresponding to the first and second channels.

In some demonstrative embodiments, the context switch may include storing, e.g., in state bank 410, first state context corresponding to a processing state of the first channel, and loading, .g., from state bank 410, previously stored second state context corresponding to a processing state of the second channel.

In one example, at the beginning of time slot 301 (FIG. 3), the state context corresponding to the channel CH1 may be loaded from state bank 410 as state 408, and switch 412 may be switched to provide to multi-channel data processor 402 data of the channel CH1 for processing. At the end of time slot 301 (FIG. 3), the state context corresponding to the channel CH1 may be stored in state bank 410, the state context corresponding to the channel CH2 may be loaded from state bank 410 as state 408, switch 414 may be switched to provide the processed data corresponding to the channel CH1 from multi-channel data processor 402 to output queue 406, and switch 412 may be switched to provide to multi-channel data processor 402 data of the channel CH2 for processing.

In some demonstrative embodiments, architecture 400 may enable utilizing multi-channel processing module 110 (FIG. 1) in conjunction with a communication module, e.g., a receiver, without performing substantially any redesign of the communication.

In some demonstrative embodiments, architecture 400 may be modified and/or adapted to support various numbers of channels, for example, in a fast and/or easy manner, e.g., by adapting queues 404 and/or 406.

Referring back to FIG. 1, in some demonstrative embodiments multi-channel data processor 120 may be configured to perform the context switch, for switching from processing the first channel to processing the second channel, during a single clock cycle, e.g., as described below.

In some demonstrative embodiments, multi-channel processing module 110 may include a memory, e.g., a RAM 130, to store a plurality of state contexts corresponding to the plurality of channels.

In some demonstrative embodiments, the context switch may include storing in RAM 130 first state context corresponding to a processing state of the first channel and loading from RAM 130 previously stored second state context corresponding to a processing state of the second channel, e.g., as described above.

In some demonstrative embodiments, the operation of storing the first state context of a channel in RAM 130 and loading the second state context from memory 130 may require a relatively long time period, for example, 200 clock cycles, e.g., if a data size of the state context is about 100 times greater than width of RAM 130, which may require a relatively large number of iterations to RAM 130.

In some demonstrative embodiments, an efficiency of multi-channel processing module 110 may be relatively low, for example, if multi-channel data processor 120 would be required wait at an idle state during this relatively long time period during each context switch.

In some demonstrative embodiments multi-channel data processing module 110 may be configured to perform the context switch, during a single clock cycle, e.g., as described below.

In some demonstrative embodiments, multi-channel processing module 110 may include a register 126 (also referred to as "shadow state register").

In some demonstrative embodiments, register 126 may be configured to exchange a content of register 126 with state context 135 within a single clock cycle. Register 126 may include, for example, a FF-based memory or any other type of memory and/or storage. Register 126 may have, for example, a data size substantially equal to or greater than the data size of the state context.

In some demonstrative embodiments, register 126 may load the second state context from RAM 130, for example, prior to the context switch between the state context of the first and second channels, e.g., while multi-channel data processor 120 is processing the first state context of the first channel.

In some demonstrative embodiments, at the context switch between the state context of the first and second channels, multi-channel data processor 120 may load the second state context from register 126 and store the first state context in register 126.

In some demonstrative embodiments, subsequent to the context switch, register 126 may write the first state context to RAM 130, and may load from RAM 130 third state context of a third channel to be subsequently processed by multi-channel data processor 120.

In some demonstrative embodiments, register 126 may be configured to "offload" from multi-cannel data processor 120 the task of accessing RAM 130, thereby enabling multi-cannel data processor 120 to process the data of the plurality of channels, e.g., substantially continuously and/or at almost 100% utilization, e.g., since the single clock which is used for the context switch may be negligible compared to the duration of each channel time slot.

Figure 5:
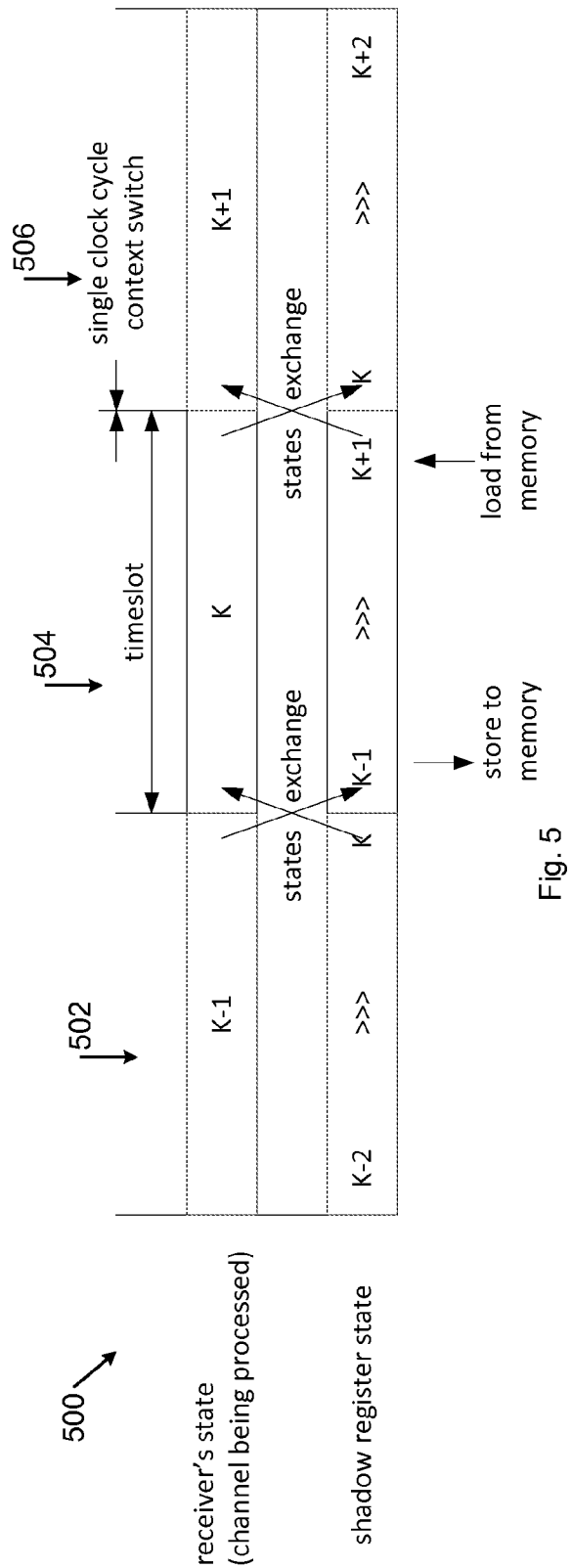
FIG. 5 is a schematic illustration of a context-switch timing scheme, in accordance with some demonstrative embodiments.

Reference is made to FIG. 5, which schematically illustrates a context-switch timing scheme 500, in accordance with some demonstrative embodiments. In some demonstrative embodiments, a multi-channel processing module, e.g., multi-channel processing module 110 (FIG. 1) may utilize context-switch timing scheme 500 to perform a sequence of context switches between state context of a sequence of channels, e.g., including the sequence of channels denoted k−2, k−1, k, k+1 and K+2.

As shown in FIG. 5, the multi-channel processing module, e.g., multi channel data processor 120 (FIG. 1), may process data of the channel k−1, for example, during a channel time slot 502 assigned to the channel k−1, e.g., as described above. During the time slot 502, the state context of the channel k−2 may be stored, for example, by writing the content of register 126 (FIG. 1) to RAM 130 (FIG. 1), and the state context of the channel k may be loaded by reading the state context of the channel k from RAM 130 (FIG. 1) into register 126 (FIG. 1).

As also shown in FIG. 5, a context switch may be performed, e.g., at the end of the timeslot 502, for example, by exchanging the content between register 126 (FIG. 1) and the state context 135 (FIG. 1) of multi-channel data processor 120 (FIG. 1), e.g., during a single clock cycle.

As also shown in FIG. 5, multi-channel data processor 120 (FIG. 1) may start processing the data of the channel k during a consecutive time slot 504, for example, using the state context of the channel k, e.g., substantially immediately.

As further shown in FIG. 5, during the time slot 504, the state context of the channel k−1 may be stored, for example, by writing the content of register 126 (FIG. 1) to RAM 130 (FIG. 1), and the state context of the channel k+1 may be loaded by reading the state context of the channel k+1 from RAM 130 (FIG. 1) into register 126 (FIG. 1).

As further shown in FIG. 5, another context switch may be performed, e.g., at the end of the timeslot 504, for example, by exchanging the content between register 126 (FIG. 1) and the state context 135 (FIG. 1) of multi-channel data processor 120 (FIG. 1), e.g., during a single clock cycle.

As further shown in FIG. 5, multi-channel data processor 120 (FIG. 1) may start processing the data of the channel k+1 during a consecutive time slot 506, for example, using the state context of the channel k+1, e.g., substantially immediately.

Referring back to FIG. 1, in some demonstrative embodiments, multi-channel processing module 110 may include a delay controller 132 to maintain a constant delay between adding an input data sample to an input queue of input queues 122 and receiving an output data sample corresponding to the input data sample from an output queue of queues 124, e.g., as described in detail below.

In some demonstrative embodiments, delay controller 132 may be configured to maintain a constant delay added by multi-channel data processing module 110 to a data path of a channel of the plurality of channels.

In some demonstrative embodiments, delay controller 132 may be configured to maintain a constant consistent delay of multi-channel data processing module 110, for example, by consistently maintaining the constant delay after each restart of multi-channel data processor 120.

Figure 6:
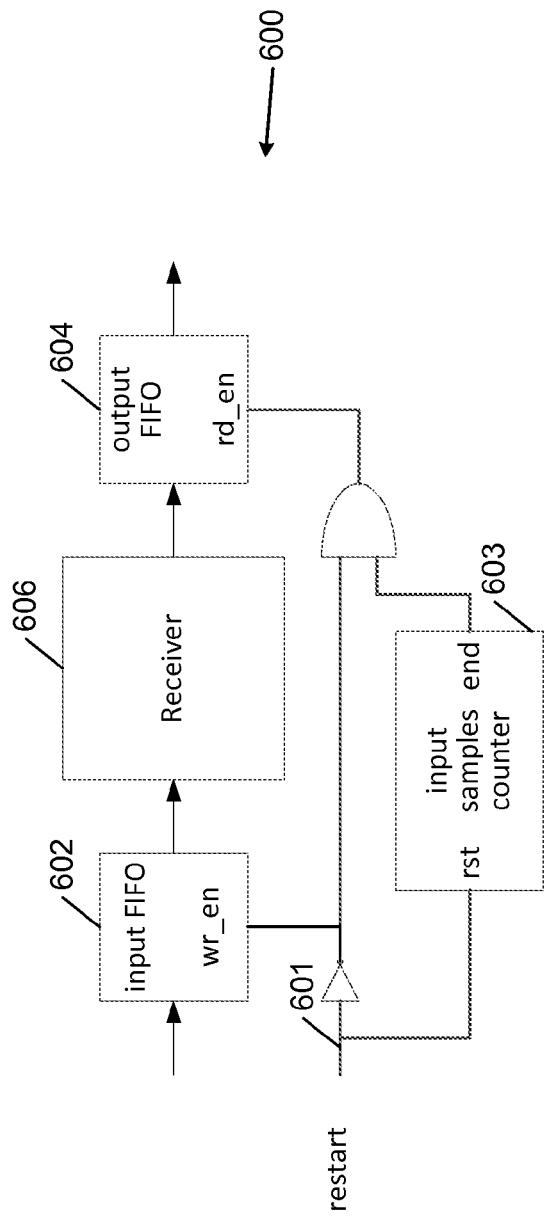
FIG. 6 is a schematic illustration of a delay control scheme, in accordance with some demonstrative embodiments.

Reference is now made to FIG. 6, which schematically illustrates a delay control scheme 600, in accordance with some demonstrative embodiments.

In some demonstrative embodiments, delay control scheme 600 may control an input queue 602 and an output queue 604 of a multi-channel data processor 606. For example, delay control scheme 600 may perform the functionality of delay controller 132 (FIG. 1), input queue 604 may perform the functionality of input queue 122 (FIG. 1), multi-channel data processor 604 may perform the functionality of multi-channel data processor 120 (FIG. 1) and/or output queue 606 may perform the functionality of output queue 124 (FIG. 1).

In some demonstrative embodiments, queues 602 and 606 may be flushed, e.g., when multi-channel data processor 606 is restarted. For example, delay control scheme 600 may receive a signal 601 indicating the restart of multi-channel data processor 606.

In some demonstrative embodiments, delay control scheme 600 may be configured to enable writing to input queue 602, while not enabling reading from output queue 604, e.g., after restart.

In some demonstrative embodiments, delay control scheme 600 may be configured to enable reading from output queue 604, for example, after a predefined threshold number of samples have been written to input queue 602. For example, delay control scheme 600 may include a sample counter 603 to count the number of samples written to input queue 602 since restart, and to enable reading from output queue 604, e.g., when the number of samples reaches the predefined threshold number of samples.

In some demonstrative embodiments, delay control scheme 600 may be configured to enable reading a sample from output queue 604 for each sample that is written to input queue 602. Accordingly, delay control scheme 600 may maintain a constant delay.

In some demonstrative embodiments, an amount of delay in the channel may be based on the predefined threshold number of samples. Delay control scheme 600 may be configured to maintain a consistent constant delay of the channel for example, by maintaining the predefined threshold number of samples constant.

In some demonstrative embodiments, the predefined threshold number of samples may represent a number of samples that are "trapped" in multi-channel processing module 110 (FIG. 1). An actual delay of multi-channel processing module 110 may be obtained, for example, by multiplying the predefined threshold number of samples by a sample rate. Accordingly, channels having different sample rates may have a different delay.

Figure 7:
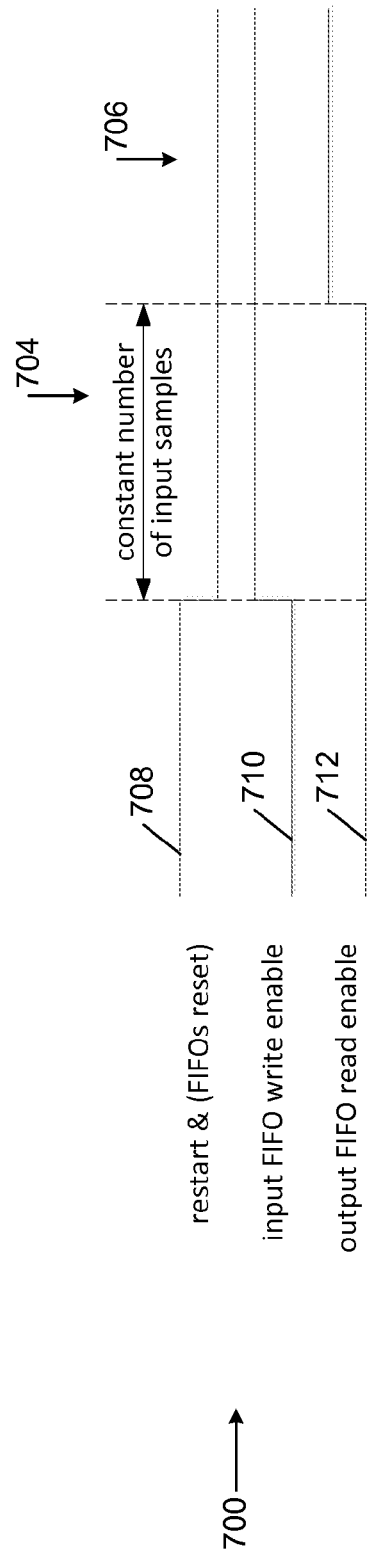
FIG. 7 is a schematic illustration of a delay-control timing scheme, in accordance with some demonstrative embodiments.

FIG. 7 is a schematic illustration of a delay-control timing scheme 700, in accordance with some demonstrative embodiments. In some demonstrative embodiments, delay-control timing scheme 700 may be utilized by delay control scheme 600 (FIG. 6). For example, delay control scheme 600 (FIG. 6) may control queues 602 and 604 (FIG. 6) using write enable signal 710 and a read enable signal 712, as described below.

As shown in FIG. 7, a restart signal 708, e.g., signal 601 (FIG. 6), may have a restart state indicating restart of multi-channel processing module 110 (FIG. 1). Write enable signal 710 may be at a disable state to disable writing to input queue 602 (FIG. 6) and read enable signal 712 may be at a disable state to disable reading from output queue 604 (FIG. 6), e.g., as long as restart signal 708 is at the restart state.

As shown in FIG. 7, write enable signal may be switched to an enable state, e.g., immediately after restart, to enable writing to input queue 602 (FIG. 6). As also shown in FIG. 7, read enable signal 712 may remain at the disable state during a time period 704, e.g., until the predefined threshold number of samples have been written to input queue 602 (FIG. 6).

As further shown in FIG. 7, read enable signal 712 may be switched to an enable state to enable reading from output queue 604 (FIG. 6), e.g., after the number of samples written to input queue 602 (FIG. 6) has reached the predefined threshold.

Referring back to FIG. 1, in some demonstrative embodiments, multi-channel processing module 110 may include a plurality of register files 124 corresponding to the plurality of channels. Register files 124 may store control data defining a configuration of multi-channel data processor 120 with respect to the plurality of channels. For example, a first register file 124 corresponding to the first channel may store control data defining a configuration of multi-channel data processor 120 with respect to the first channel, and a second register file 124 corresponding to the second channel may store control data defining a second configuration, different from the first configuration, of multi-channel data processor 120 with respect to the second channel.

In some demonstrative embodiments, multi-channel data processor 120 may configure control parameters corresponding to the plurality of channels based on register files 124. The control parameters of a channel may include, for example, a baud of the channel, a rate of the channel, a constellation of the channel, and the like.

In some demonstrative embodiments, a register file 124 corresponding to a channel may also store status data corresponding to a status of the channel, e.g., as by multi-channel data processor 110 when processing the channel. For example, the first register file 124 may store status data corresponding to a status of the first channel provided by multi-channel data processor 110 when processing the first channel, and/or the second register file 124 may store status data corresponding to a status of the second channel provided by multi-channel data processor 110 when processing the second channel.

In some demonstrative embodiments, register files 124 may be accessed by a host processor ("host") 168 of device 100. For example, host 168 may update the control information of one or more of register files 124, and/or host 168 may read the status information of one or more registers file 124. In one example, host 168 may read the first register file 124, e.g., when multi-channel data processor 120 processes the second channel.

Figure 8:
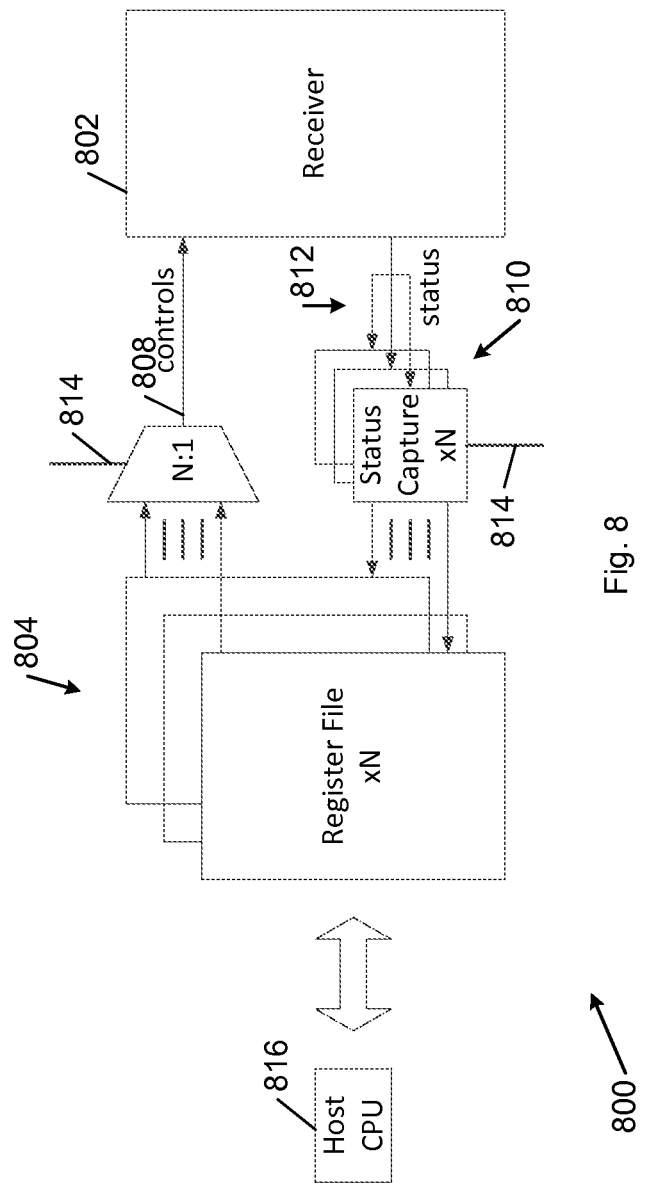
FIG. 8 is a schematic illustration of a register file scheme, in accordance with some demonstrative embodiments.

Reference is made to FIG. 8, which schematically illustrates a register file scheme 800, in accordance with some demonstrative embodiments.

In some demonstrative embodiments, register file scheme 800 may be configured to enable setting two or more different configurations to two or more channels.

In some demonstrative embodiments, register file scheme 800 may include a plurality of register files 804 corresponding to a plurality of channels to be processed by a multi-channel data processor 802. For example, register files 804 may perform the functionality of register files 124 (FIG. 1).

In some demonstrative embodiments, register files 804 may be accessible by a host processor 816. For example, host processor 816 may upload to a register file 804, which corresponds to a particular channel, configuration information to be applied for configuring multi-channel data processor 802 with respect to the particular channel.

In some demonstrative embodiments, register file scheme 800 may include a multiplexer 806 to provide the configuration information of the particular channel to multi-channel data processor 802, e.g., at the timeslot assigned for processing the particular channel. For example, multiplexer 806 may be controlled by a signal 814 indicative of the channel currently being processed by multi-channel data processor 802.

In some demonstrative embodiments, register file scheme 800 may be configured to enable writing to register files 804 status information provided by multi-channel data processor 802. Host 816 may access register files 804 to read the status corresponding to the channels.

In some demonstrative embodiments, register file scheme 800 may include a plurality of capture registers 810 corresponding to the plurality of register files 804. For example, a particular register 810 may capture the value of a status signal 812 when the particular channel is being processed by multi-channel data processor 802. Accordingly, host 816 may be able to read the status of the particular channel, e.g., even when the particular channel is not being processed by multi-channel processor 802. Capture registers 810 may be selectively associated with multi-channel data processor 802, e.g., based on signal 814.

Figure 9:
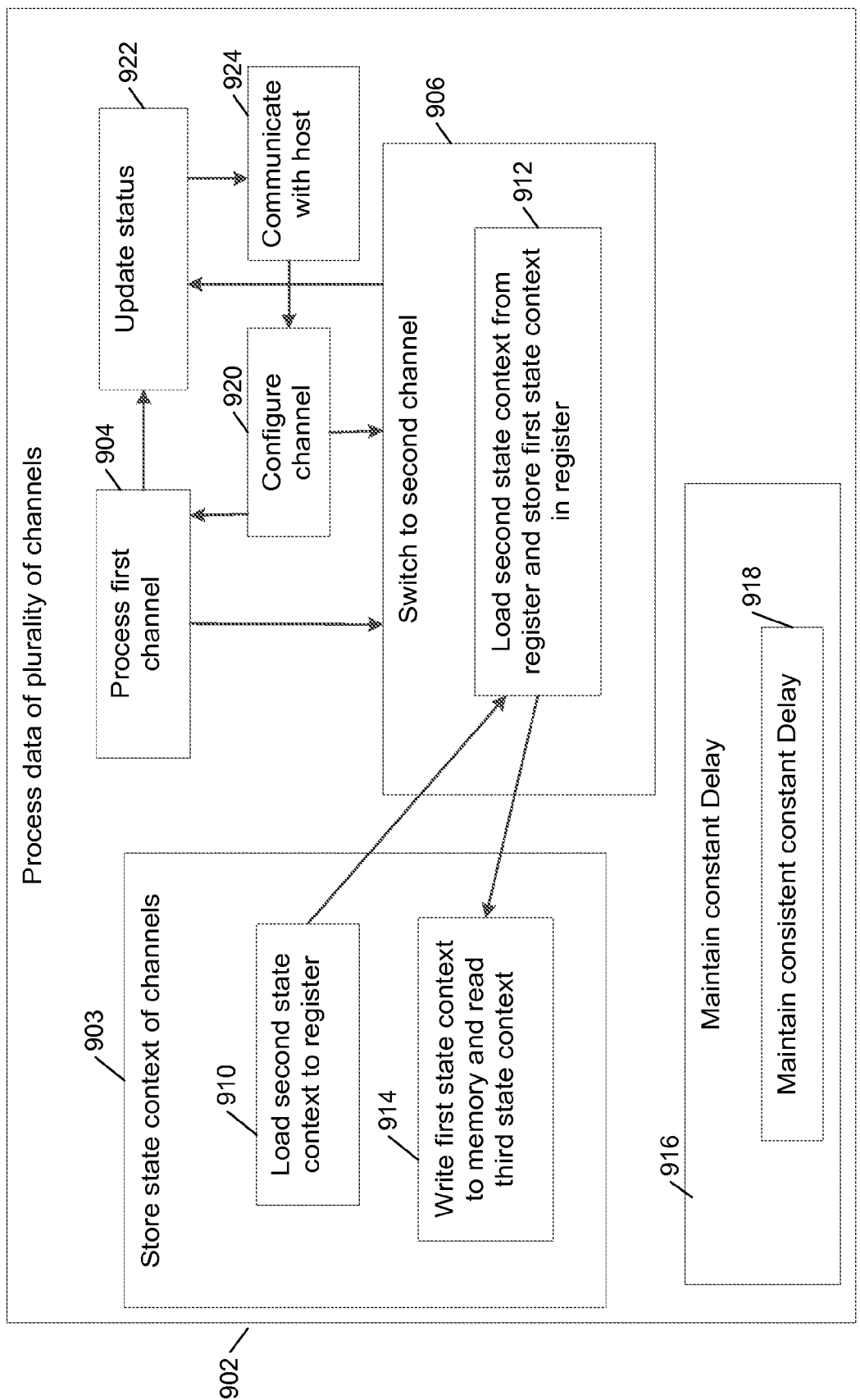
FIG. 9 is a schematic flow-chart illustration of a method of multi-channel processing, in accordance with some demonstrative embodiments.

Reference is now made to FIG. 9, which schematically illustrates a method of multi-channel processing, in accordance with some demonstrative embodiments. One or more operations of the method of FIG. 9 may be performed, for example, by a system, e.g., system 100 (FIG. 1), a device, e.g., device 102 and/or 104 (FIG. 1), a multi-channel processing module, e.g., multi-channel processing module 110 (FIG. 1), and/or a multi-channel data processor, e.g., multi-channel data processor 120 (FIG. 1).

As indicated at block 902, the method may include processing data of a plurality of channels by a multi-channel data processor. For example, multi-channel data processing module 110 (FIG. 1) may process the data of the N channels, e.g., as described above.

As indicated at block 903, processing the data of the plurality of channels may include storing in a memory a plurality of state contexts corresponding to the plurality of channels. For example, multi-channel data processing module 110 (FIG. 1) may store in RAM 130 (FIG. 1) N state contexts corresponding to the N channels.

As indicated at block 904, processing the data of the plurality of channels may include processing a first channel of the plurality of channels. For example, multi-channel data processor 120 (FIG. 1) may process the data of a k-th channel, e.g., as described above.

As indicated at block 906, processing the data of the plurality of channels may include switching from the first channel to a second channel of the plurality of channels by performing a context switch during a single clock cycle. For example, multi-channel data processing module 110 (FIG. 1) may switch from the k-th channel to a k+1 channel by performing a context switch during a single clock cycle, e.g., as described above.

In some demonstrative embodiments, the context switch may include storing first state context corresponding to a processing state of the first channel, e.g., from the multichannel processor, and loading, e.g., to the multi-channel processor, previously stored second state context corresponding to a processing state of the second channel. For example, multi-channel data processing module 110 (FIG. 1) may store state context corresponding to a processing state of the k-th channel, e.g., in RAM 130 (FIG. 1), and may load, e.g., from RAM 130 (FIG. 1) to multi-channel processor 120 (FIG. 1), previously stored state context corresponding to a processing state of the k+1 channel, e.g., as described above.

As indicated at block 910, the method may include loading the second state context from the memory to a register, e.g., prior to the context switch. For example, multi-channel processing module 110 (FIG. 1) may load the state context corresponding to the k+1 channel into register 126 (FIG. 1), e.g., as described above.

As indicated at block 912, the method may include at the context switch, loading the second state context from the register to the multi-channel data processor and storing the first state context in the register. For example, multi-channel processing module 110 (FIG. 1) may load the state context corresponding to the k+1 channel from register 126 (FIG. 1) to multi-channel data processor 120 (FIG. 1), and may store the state context of the k-th channel in register 126 (FIG. 1), e.g., as described above.

As indicated at block 914, the method may include writing the first state context from the register to the memory and loading from the memory to the register third state context of a third channel to be subsequently processed by the multi-channel data processor, e.g., subsequent to the context switch. For example, multi-channel processing module 110 (FIG. 1) may write the state context of the k-th channel from register 126 (FIG. 1) to Ram 130 (FIG. 1), and may load from RAM 130 (FIG. 1) to register 126 (FIG. 1) state context of a k+2 channel, e.g., as described above.

As indicated at block 916, the method may include maintaining a constant delay between adding an input data sample to an input queue and receiving an output data sample corresponding to the input data sample from an output queue. For example, delay controller 132 (FIG. 1) may maintain a constant delay between adding an input data sample to input queue 122 (FIG. 1) and receiving an output data sample corresponding to the input data sample from output queue 124 (FIG. 1), e.g., as described above.

As indicated at block 918, maintaining the constant delay may include consistently maintaining the constant delay after each restart of the multi-channel data processor. For example, delay controller 132 (FIG. 1) may maintain the consistent constant delay, e.g., as described above.

As indicated at block 920, the method may include configuring the multi-channel data processor with first configuration for processing the first channel, and configuring the multi-channel data processor with a second configuration, different from the first configuration, for processing the second channel. For example, multi-channel data processor 120 (FIG. 1) may be configured based on register files 124 (FIG. 1), e.g., as described above.

As indicated at block 922, the method may include storing status data corresponding to a status of the first channel provided by the multi-channel data processor when processing the first channel. For example, multi-channel data processor 120 (FIG. 1) may provide the status data to register files 124 (FIG. 1), e.g., as described above.

As indicated at block 924, the method may include communicating with a host processor, for example, for providing the status data to the host processor, e.g., when the multi-channel data processor processes the second channel, and/or receiving the configuration information from the host processor. For example, host processor 168 (FIG. 1) may access register files 124 (FIG. 1), for example, to update the configuration information and/or to retrieve the status information, e.g., as described above.

Figure 10:
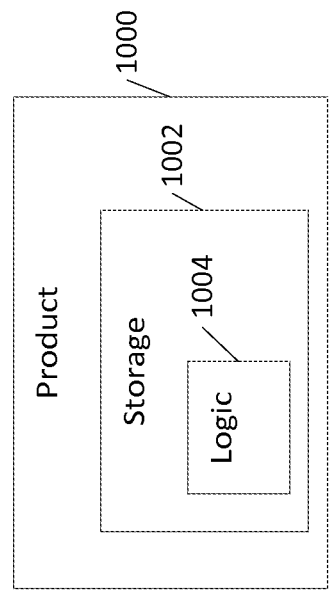
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include a non-transitory machine-readable storage medium 1002 to store logic 1004, which may be used, for example, to perform at least part of the functionality of device 102 (FIG. 1), device 104 (FIG. 1), multi-channel processing module 110 (FIG. 1), multi-channel data processor 120 (FIG. 1), and/or to perform one or more operations of the method of FIG. 9. The phrase "non-transitory machine-readable medium" is directed to include all computer-readable media, with the sole exception being a transitory propagating signal.

In some demonstrative embodiments, product 1000 and/or machine-readable storage medium 1002 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some demonstrative embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
 a multi-channel data processor to process data of a plurality of channels, said multi-channel data processor is to switch from processing a first channel to processing a second channel of said plurality of channels by performing a context switch during a single clock cycle, the context switch including storing first state context corresponding to a processing state of said first channel and loading previously stored second state context corresponding to a processing state of said second channel;
 a random-access-memory (RAM) to store a plurality of state contexts corresponding to said plurality of channels;
 a register to load said second state context from said RAM, prior to said context switch, wherein, at said context switch, said multi-channel data processor is to load said second state context from said register and to store said first state context in said register, and, subsequent to said context switch, said register is to write the first state context to the RAM and to load from said RAM third state context of a third channel to be subsequently processed by said multi-channel data processor;
 a plurality of input queues to queue input data from said plurality of channels to be processed by said multi-channel data processor;
 a plurality of output queues to queue output data processed by said multi-channel data processor; and
 a delay controller to maintain a constant delay between adding an input data sample to an input queue and providing an output data sample corresponding to the input data sample from an output queue, said delay controller to consistently maintain said constant delay after each restart of said multi-channel data processor.

2. The apparatus of claim 1, wherein said delay controller is to count a number of data samples written to the input queue since said restart and to enable reading from the output queue when the number of data samples reaches a predefined threshold.

3. The apparatus of claim 1 comprising a plurality of register files corresponding to said plurality of channels, wherein a first register file corresponding to said first channel is to store control data defining a first configuration of said multi-channel data processor with respect to said first channel, and a second register file corresponding to said second channel is to store control data defining a second configuration, different from said first configuration, of said multi-channel data processor with respect to said second channel, and wherein said multi-channel data processor is to configure control parameters corresponding to said plurality of channels based on said plurality of register files.

4. The apparatus of claim 3, wherein said first register file is to store status data corresponding to a status of said first channel provided by said multi-channel data processor when processing said first channel, and wherein said first register file is to be read by a host processor when said multi-channel data processor processes said second channel.

5. The apparatus of claim 1 comprising a multi-channel communication receiver including said multi-channel data processor to process received data of a plurality of communication channels.

6. The apparatus of claim 1 comprising a system on chip (SoC) including said multi-channel data processor.

7. A system comprising:
a communication device including:
a radio-frequency (RF) tuner to communicate over a plurality of communication channels;
a multi-channel data processor to process data of said plurality of communication channels, said multi-channel data processor is to switch from a first channel to a second channel of said plurality of communication channels by performing a context switch during a single clock cycle, the context switch including storing first state context corresponding to a processing state of said first channel and loading previously stored second state context corresponding to a processing state of said second channel;
a random-access-memory (RAM) to store a plurality of state contexts corresponding to said plurality of communication channels;
a register to load said second state context from said RAM, prior to said context switch, wherein, at said context switch, said multi-channel data processor is to load said second state context from said register and to store said first state context in said register, and, subsequent to said context switch, said register is to write the first state context to the RAM and to load from said RAM third state context of a third channel to be subsequently processed by said multi-channel data processor;
a plurality of input queues to queue input data from said plurality of communication channels to be processed by said multi-channel data processor;
a plurality of output queues to queue output data processed by said multi-channel data processor; and
a delay controller to maintain a constant delay between adding an input data sample to an input queue and providing an output data sample corresponding to the input data sample from an output queue, said delay controller to consistently maintain said constant delay after each restart of said multi-channel data processor.

8. The system of claim 7, wherein said communication device comprises a plurality of register files corresponding to said plurality of communication channels, wherein a first register file corresponding to said first channel is to store control data defining a first configuration of said multi-channel data processor with respect to said first channel, and a second register file corresponding to said second channel is to store control data defining a second configuration, different from said first configuration, of said multi-channel data processor with respect to said second channel, and wherein said multi-channel data processor is to configure control parameters corresponding to said plurality of communication channels based on said plurality of register files.

9. The system of claim 8, wherein said first register file is to store status data corresponding to a status of said first channel provided by said multi-channel data processor when processing said first channel, and wherein said first register file is to be read by a host processor when said multi-channel data processor processes said second channel.

10. The system of claim 7, wherein said communication device comprises a cable communication device including a multi-channel communication receiver, which includes said multi-channel data processor to process received data of said plurality of communication channels.

11. A method comprising:
storing in a memory a plurality of state contexts corresponding to a plurality of channels;
processing data of said plurality of channels by a multi-channel data processor, said processing including switching from a first channel to a second channel of said plurality of channels by performing a context switch during a single clock cycle, the context switch including storing first state context corresponding to a processing state of said first channel and loading previously stored second state context corresponding to a processing state of said second channel;
prior to said context switch, loading said second state context from said memory to a register;
at said context switch, loading said second state context from said register to said multi-channel data processor and storing said first state context in said register;
subsequent to said context switch, writing the first state context from said register to said memory and loading from said memory to said register third state context of a third channel to be subsequently processed by said multi-channel data processor;
queuing input data from said plurality of channels in a plurality of input queues;
queuing output data processed by said multi-channel data processor in a plurality of output queues; and
maintaining a constant delay between adding an input data sample to an input queue and providing an output data sample corresponding to the input data sample from an output queue, maintaining the constant delay comprising consistently maintaining said constant delay after each restart of said multi-channel data processor.

12. The method of claim 11, wherein said memory comprises a random-access-memory (RAM).

13. The method of claim 11 comprising configuring said multi-channel data processor with a first configuration for processing said first channel, and configuring said multi-channel data processor with a second configuration, different from said first configuration, for processing said second channel.

14. The method of claim 11 comprising storing status data corresponding to a status of said first channel provided by said multi-channel data processor when processing said first channel, and providing said status data to a host processor when said multi-channel data processor processes said second channel.

15. A product including a non-transitory storage medium having stored thereon instructions that, when executed by a machine, result in:
storing in a memory a plurality of state contexts corresponding to a plurality of channels;
processing data of said plurality of channels by a multi-channel data processor, said processing including switching from a first channel to a second channel of said plurality of channels by performing a context switch during a single clock cycle, the context switch including storing first state context corresponding to a processing state of said first channel and loading previously stored second state context corresponding to a processing state of said second channel;

prior to said context switch, loading said second state context from said memory to a register;

at said context switch, loading said second state context from said register to said multi-channel data processor and storing said first state context in said register;

subsequent to said context switch, writing the first state context from said register to said memory and loading from said memory to said register third state context of a third channel to be subsequently processed by said multi-channel data processor;

queuing input data from said plurality of channels in a plurality of input queues;

queuing output data processed by said multi-channel data processor in a plurality of output queues; and maintaining a constant delay between adding an input data sample to an input queue and providing an output data sample corresponding to the input data sample from an output queue, maintaining the constant delay comprising consistently maintaining said constant delay after each restart of said multi-channel data processor.

16. The product of claim 15, wherein said instructions result in storing status data corresponding to a status of said first channel provided by said multi-channel data processor when processing said first channel, and providing said status data to a host processor when said multi-channel data processor processes said second channel.

17. The product of claim 15, wherein said instructions result in configuring said multi-channel data processor with a first configuration for processing said first channel, and configuring said multi-channel data processor with a second configuration, different from said first configuration, for processing said second channel.

* * * * *